Feb. 27, 1945. H. O. KOCH 2,370,358
LINE SNATCH
Filed June 5, 1943
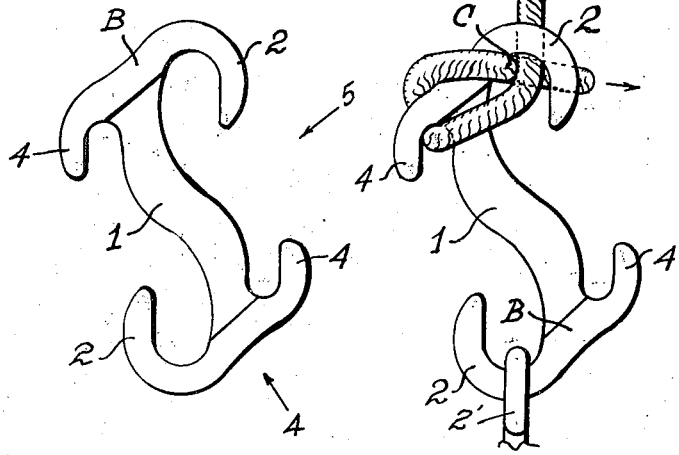
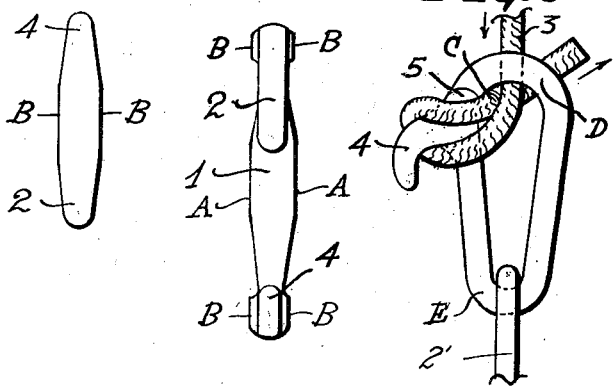
INVENTOR.
HARRY O. KOCH Patented Feb. 27, 1945

2,370,358

UNITED STATES PATENT OFFICE 2,370,358

LINE SNATCH

Harry O. Koch, Wichita, Kans.

Application June 5, 1943, Serial No. 489,854

1 Claim. (Cl. 24—230.5)

This invention relates to new and useful improvements in a line snatch and has for its principal object a link adapted to engage a line looped back on itself in such a way that slack in the line is easily taken up and released. Furthermore, the line automatically binds itself frictionally when tensioned to engagement.

A further object of this invention is to provide a link reversible end for end or turned sidewise selectively.

These and other objects will hereinafter be more fully explained, reference being had to the accompanying drawing forming a part thereof, and in which like characters will apply to like parts in the different views.

Referring to the drawing:

Fig. 1 is a side view of the link.

Fig. 2 is a view similar to that of Fig. 1 but including a line and anchor hook-up.

Fig. 3 is an edge view of Fig. 2.

Fig. 4 is an end view of Fig. 1 looking in the direction of arrow 4.

Fig. 5 is a view looking in the direction of arrows 5 in Fig. 1.

Fig. 6 is a modification of the link and its line hook-up.

Fig. 7 is an edge view omitting the line.

The invention herein disclosed consists of a snatch block for guy lines, clothes lines, or the like, said snatch block to function as a link interposed in the lines to tension or release tension of the line, and hereinafter referred to as a link.

The components of the link comprise a centrally disposed body portion 1, the sides of which are crowned outward as at A to reinforce the body for tensile endurance. Integrally joined to the ends of said body portion are hooks 2 oppositely extending, the link having one of its hooks anchored to a fixed eye bolt 2' while the other hook is engaged by a looped line 3 adjustably applied to vary the length and tension of the line, each hook being arranged by an arcuate form, each of said hooks having a crown B on each side thereof where they join the body, said crowns to increase the surface for frictional engagement of a portion C of a looped line 3 and furthermore to insure a lapped engagement of the looped portion where it passes through the opening of the arcuate hook of the link. Positioned on opposite edges of the link adjacent its arcuate hooks are other hooks 4 to be engaged by the loops of the line as anchoring means therefor to the link and being rigidly secured against slipping by the lapped engagement of the line as above described and the said line may be tensioned by an opposite pull of the line portions in the direction indicated by arrows in Figs. 2, 3, and 6, and by an opposite pull on the line, the same will be released. The link being thus formed will permit the loop of the line to pass through from either side of the link with equal result and likewise through the link as formed in Fig. 6, the latter being oblong, the ends of which are arcuate in form as at D and E, one of which is of a greater diameter than the other, the end of the link having the smaller diameter having a similar permanent anchor element as above described for its respective end of the link. Adjacent the end of the link having the greater diameter is provided a pair of spurs 5 oppositely extending from the sides of the link body, said spurs to direct the upper fold of the line where it passes through the link in such a way that the other or lower fold will cross the upper line to bind the same against the arc of the link to avoid slipping when the line is tensioned, the action for tensioning and releasing the line being the same as above described, and such other modifications may be made as lie within the scope of the appended claim.

Having fully described my invention what I claim as new and desire to secure by Letters Patent is:

In a line snatch of the class described comprising a body portion, the contour of which has the form of reversed curvature edgewise of the snatch while its form transverse to its edges is oval, and each end of the body portion terminating with hooks that are oppositely turned, and other hooks adjacent the first said hooks, said other hooks being oppositely turned from that of said first hooks, and a raised portion extending from first to said last hooks correspondingly, all for the purpose specified.

HARRY O. KOCH.